(12) United States Patent
Hermey et al.

(10) Patent No.: US 6,745,555 B2
(45) Date of Patent: Jun. 8, 2004

(54) ENERGY GUIDING CHAIN

(75) Inventors: Andreas Hermey, Hennef (DE); Frank Blase, Bergisch Gladbach (DE); Günter Blase, Bergisch Gladbach (DE); Thilo Jaeker, Königswinter (DE)

(73) Assignee: Igus Spritzgussteile für die Industrie GmbH, Köln (DE)

( * ) Notice: Subject to any disclaimer, the term of this patent is extended or adjusted under 35 U.S.C. 154(b) by 67 days.

(21) Appl. No.: 10/123,820

(22) Filed: Apr. 15, 2002

(65) Prior Publication Data

US 2003/0000198 A1 Jan. 2, 2003

(30) Foreign Application Priority Data

Apr. 23, 2001 (DE) ..................... 201 07 003 U

(51) Int. Cl.⁷ .................................. F16L 3/14
(52) U.S. Cl. .......................... 59/78.1; 248/49
(58) Field of Search .............. 59/78, 78.1; 248/49, 248/51

(56) References Cited

U.S. PATENT DOCUMENTS

| | | | | |
|---|---|---|---|---|
| 4,840,023 A | * | 6/1989 | Borsani | 59/78.1 |
| 4,852,342 A | * | 8/1989 | Hart | 59/78.1 |
| 5,900,586 A | * | 5/1999 | Carr | 59/78.1 |
| 5,980,409 A | * | 11/1999 | Blase | |
| 6,321,524 B1 | * | 11/2001 | Bro | 59/78.1 |
| 6,408,888 B1 | | 6/2002 | Bäumer et al. | |

FOREIGN PATENT DOCUMENTS

| | | | |
|---|---|---|---|
| DD | 249 742 A1 | 9/1987 | |
| DE | 35 22 885 C2 | 6/1988 | |
| DE | 199 15 035 C2 | 8/2001 | |
| DE | 101 16 403 A1 | 11/2002 | |
| EP | 0 789 167 A1 | * 8/1997 | |
| JP | 2001008331 A | 1/2001 | |

* cited by examiner

*Primary Examiner*—David Jones
(74) *Attorney, Agent, or Firm*—Akin Gump Strauss Hauer & Feld, L.L.P.

(57) ABSTRACT

An energy guiding chain for guiding hoses, cables or the like has numerous chain links (2), connected to one another in articulated fashion. Each chain link has opposing straps (3) with inside and outside lateral surfaces as well as narrow surfaces perpendicular to the lateral surfaces and essentially parallel to the longitudinal direction of the chain. At least some of the chain links have at least one cross-member (4a, 4b) connecting the opposing straps. The articulated joint includes joint elements (8) which extend between adjacent straps. The joint elements are elastically deformable in the bending direction of the chain links (1), and extend at least partially, preferably entirely, between the inside and outside lateral surfaces of the straps (3). The joint elements (8) can be located in laterally open recesses in the straps. In this manner, the energy guiding chain can travel to form a lower strand (7), a deflection zone (6) and an upper strand (5).

28 Claims, 6 Drawing Sheets

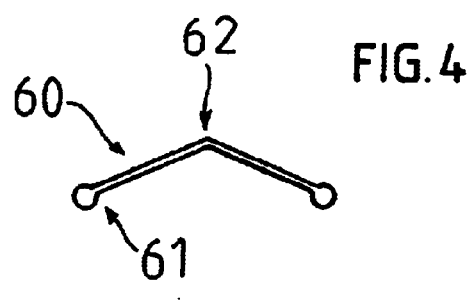
FIG.4
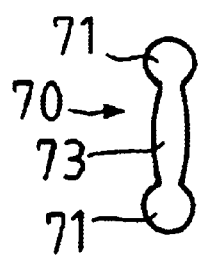 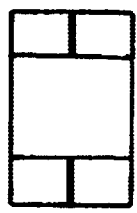 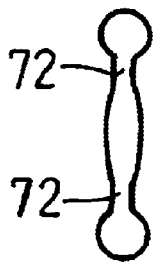 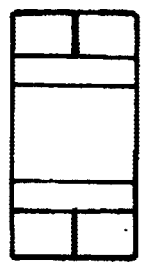
FIG.5a    FIG.5b    FIG.5c    FIG.5d
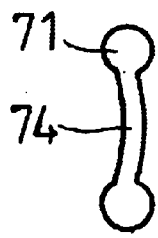 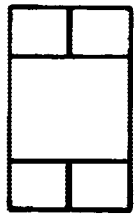  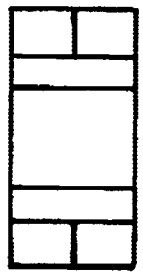
FIG.5e    FIG.5f    FIG.5g    FIG.5h
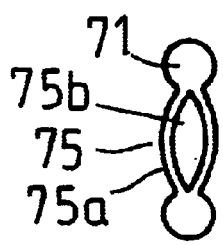 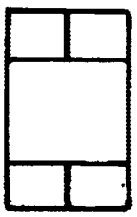  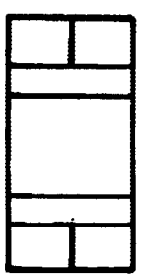
FIG.5i    FIG.5k    FIG.5l    FIG.5m

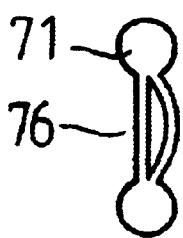 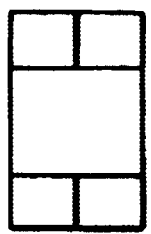  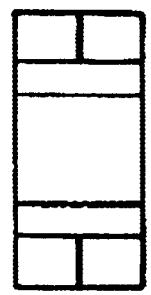
FIG.5n    FIG.5o    FIG.5p    FIG.5q
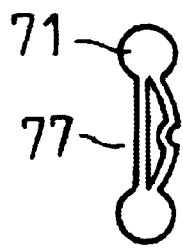 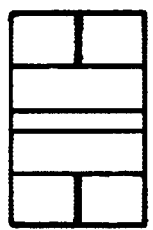  
FIG.5r    FIG.5s    FIG.5t    FIG.5u
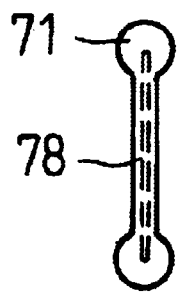 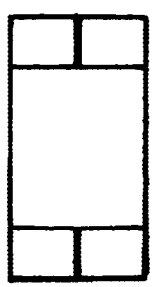  
FIG.5v    FIG.5w    FIG.5x    FIG.5y

ENERGY GUIDING CHAIN

BACKGROUND OF THE INVENTION

The invention relates to an energy guiding chain for guiding hoses, cables or the like that has numerous chain links, where adjacent chain links are connected to one another in articulated fashion, where the chain links have opposing straps with inside and outside lateral surfaces as well as narrow surfaces perpendicular thereto and essentially parallel to the longitudinal direction of the chain, at least some of the chain links have at least one cross-member connecting the straps, the articulated joint between adjacent chain links is located between the narrow surfaces of the straps, and the energy guiding chain can travel, forming a lower strand, a deflection zone and an upper strand.

Various generic energy guiding chains are known, in which adjacent straps have lateral overlapping areas provided with joint pins and corresponding recesses in order to assemble the articulated joint. The articulated joint is located half-way up the straps. An energy guiding chain of this kind is known, for example, from EP 0 803 032 B1. Although energy guiding chains of this kind have proven to be very effective in principle, they have the disadvantage that the articulated joints made of joint pins and corresponding recesses are subject to wear due to frictional forces. This wear leads to a certain need for repair and servicing of the energy guiding chain and, furthermore, is undesirable in certain fields of application, such as food production or the production of devices under clean-room conditions, such as semiconductor products.

Cable guiding devices are further known from EP 0 789 167 A1, for example, where the chain links are connected to one another in articulated fashion by a long, flexible strip, so that the cable guiding device can travel in virtually abrasion-free fashion. Because the long strip is mounted on the cross-members connecting the straps of a chain link, the articulated joints of the chain links are located at the lower end of the straps. Consequently, the neutral fibre of the cable guiding device—which does not change in length when the energy guiding chain bends, in contrast to the areas spaced apart at the height of the articulated joints—is also located at the lower end of the chain straps. However, this is a disadvantage in various applications.

BRIEF SUMMARY OF THE INVENTION

Consequently, an object of the invention is to provide an energy guiding chain that has articulated joints located between the narrow surfaces of the chain straps, allows low-wear, abrasion-free travel, and is simple and inexpensive to manufacture.

According to the invention, the object is solved by an energy guiding chain, in which the articulated joints include joint elements that are elastically deformable in the bending direction of the chain links and designed as separate components, where the joint elements extend at least partially between the inside and outside lateral surfaces of the straps. During pivoting motion, the elastically deformable joint element exerts elastic restoring forces on the two adjacent chain links, preferably through the entire pivoting angle. When the energy guiding chain is in an extended position, the joint element preferably extends straight in the longitudinal direction.

Due to the design of the energy guiding chain according to the invention, it is possible for the chain to travel without abrasion, where the position of the joint element on the straps, its dimensions and, in particular, the material it is made of can be optimally adapted to respective requirements, regardless of the design of the straps. For example, the straps and the joint elements can be made of different materials, particularly different plastic materials. The joint elements can be made of a material with high long-term flexural strength, notch resistance and/or suitable elasticity. The elastic properties of the joint element are preferably selected such that the joint element remains in the elastic range under every expected bending load and exerts elastic restoring forces on the straps connected by it in the event of deformation. The material of the straps can ensure particularly high dimensional stability (against tension, torsion and/or compression forces) and high flexural strength of the straps, and also of the chain links in general. In particular, the material can display low sliding friction, which is advantageous in energy guiding chains in which the upper strand slides on the lower strand when the energy guiding chain travels.

Because the straps and joint elements are designed as separate parts according to the invention, the straps can be designed to absorb virtually all compression and tension forces acting on the energy guiding chain in the longitudinal direction, while the function of the joint elements is exclusively limited to the formation of articulated joints subject to no significant load caused by compression or tension forces.

The joint element preferably extends entirely between the inside and outside lateral surfaces of the straps. The width of the joint elements can be exactly equal to the width of the straps at the height of the joint elements, thus avoiding areas of the joint elements projecting beyond the sides of the straps.

The chain links can each have an upper and lower cross-member, which close off the space between opposing straps from the outside, where one of the cross-members can also be designed as a split cross-member. In the design according to the invention, it is also possible when using engaging stops, for example, to provided only every second or third (etc.) chain link with cross-members. The cross-member connecting opposing straps can be integrally molded on the straps or mounted in detachable fashion, particularly by means of a suitable snap connection or other mounting elements. At least one of the cross-members is preferably of rigid design and mounted rigidly on the opposing straps.

When the energy guiding chain is in a straight position for assembly, the joint element is preferably located at a vertical distance between the upper and lower cross-members, if present, or between the mounting elements for cross-members, and at a vertical distance from the cross-members, particularly at a point near the middle of the strap height that is at least one-quarter of the strap height away from the lower edge of the straps. In particular, the joint element can be positioned half-way up the straps. In this way, the chain links can be arranged symmetrically relative to the neutral fiber of the energy guiding chain, where the neutral fiber does not undergo any change in length when the chain moves from a straight to a curved position. This is advantageous for various applications, because the lines guided inside are subjected to a more uniform load during bending motion of the energy guiding chain.

The chain links preferably have means for damping the noise caused by operation of the stops. The noise damping means are preferably designed as brakes arranged in the region of the stops and/or the corresponding stop surfaces. In particular, the noise damping means can be arranged in the pockets of the corresponding straps that accommodate the stops. The stop surfaces, which simultaneously delimit the pockets on the front sides of the straps and can therefore be of web-like design, can be of elastic design, for example by selecting a suitable material or material thickness, where the material of the stop surfaces can have a higher modulus of elasticity than the material of the adjacent strap areas. Alternatively and/or additionally, the stops themselves can be of elastic design, for example at least partially made of a material of elevated elasticity. Separate damping elements, such as damping strips made of a noise-damping material, can also be provided on the stops and/or corresponding stop surfaces, preferably inside the pockets accommodating the stops. The stops and the corresponding stop surfaces can additionally or alternatively be designed such that a first partial area of a stop comes into contact with a first partial area of the corresponding stop surface at a first point in time, and a second partial area of the stop comes into contact with a second partial area of the stop surface at a later point in time, so that at the end of the contacting process, the entire active surface of the stop is in contact with the corresponding stop surface.

The joint elements are particularly preferably designed as spring elements that exert elastic restoring forces on the adjacent chain links when the chain links are bent out of the straight position of the energy guiding chain. This has a noise damping effect when the energy guiding chain is in motion. The elastic restoring forces preferably cause return motion of the chain links through their entire pivoting angle. The restoring forces can be so high that return motion of the chain links occurs automatically all the way into the limit position of the chain links when the energy guiding chain is straight. This can apply to an empty energy guiding chain, as well as to one containing at least one guided element, such as a hose, a line or the like, or to a maximally loaded energy guiding chain.

The joint elements can be of various designs. They can have a changing cross-section and/or areas of different material thickness between the mounting areas. The cross-section and/or material thickness preferably increase away from the mounting areas and can reach a maximum in the central region of the joint element. The cross-section and/or material thickness can also be constant in a first section starting at the respective mounting area, and then vary starting at a distance from the mounting area, particularly in that the cross-section and/or material thickness increase or have an area of less material, such as a constriction or inside cavity. The change in cross-section and/or material thickness preferably occurs in the primary plane of the associated chain straps. A change in cross-section can particularly be achieved by a vertical and/or lateral offset of an area of the joint element. An area of less material can be provided with a constant or changing cross-section in the respective area of the joint element, where the cross-section can increase or decrease. For example, an inside cavity can be provided in conjunction with a constant or changing cross-section of the joint element. A closed or open cavity, particularly one that is open on the side in assembly position, can also be provided, which can correspond to a split in the material that forms different strands with a constant overall material thickness. The individual strands can be of different shape, such as straight or curved, and display indentations and/or protrusions, where any combinations are possible. The change in cross-section and/or material thickness can be continuous or incremental. The travelling characteristics of the energy guiding chain can be defined by different designs of the joint elements, e.g. the force required to bend the straps, the change in this force as the pivoting angle changes, or the noise damping characteristics of the joint elements, which can be based on the exertion of restoring forces during bending. This is of particular importance in the case of exchangeable joint elements.

If the joint element is designed as a spring element, each chain link can be provided with contact surfaces that lie against the joint element through the entire pivoting angle, thereby absorbing the elastic restoring forces acting on the chain links during elastic deformation of the joint element due to the bending of the chain links. The joint element is preferably arranged between the contact surfaces in a press fit. The contact surfaces of the straps, and the corresponding surfaces of the joint element, preferably have plane surfaces, whose surface normals are parallel to the inside and outside lateral surfaces of the straps and perpendicular to the longitudinal direction of the energy guiding chain when it is in straight position.

The joint element can be designed as a plate-like component, meaning also a strip-shaped component. In this case, the joint element has essentially flat top and bottom sides, which face the top and bottom sides of the straps. Areas of the straps preferably contact the top and/or bottom side of the flat areas of the joint elements. However, the joint elements can also have other suitable cross-sections.

On the other hand, the joint element can also be designed as a component that is curved in the plane parallel to the inside and outside lateral surfaces of the straps, so that it generates preliminary tension in a bending direction when inserted in the straps in the straight, longitudinal position.

Mounting areas of the joint element can contact the two adjacent side straps, which absorb tension forces acting in the longitudinal direction of the energy guiding chain. To this end, the joint element can be mounted on the adjacent straps by means of a force, form and/or bonded fit. The tension-absorbing mounting of the joint elements on the straps can be such that it is only geared to low tension forces, e.g. to facilitate assembly of the energy guiding chain. To this end, the mounting areas of the joint elements can display top or bottom-side projections, preferably on the free ends facing away from the elastically deformable areas, which can extend over the entire width of the joint elements. Additional tension-absorbing means can be provided if necessary to absorb higher tension forces.

The respective joint element can be designed for the articulated connection of exactly two adjacent chain links in the longitudinal direction of the energy guiding chain. The joint element can also connect several chain links to one another in articulated fashion and, for this purpose, extend over the length of a number of chain links, such as three to ten or more chain links. As a result, several consecutive joint elements can be provided in the longitudinal direction of the energy guiding chain, each of which connects chain links to one another in articulated fashion in only one section of the energy guiding chain. Consequently, if a joint element needs to be replaced, only one section of the energy guiding chain needs to be disassembled, instead of the entire chain. If appropriate, the joint elements can also extend over the entire length of the energy guiding chain. If each joint element connects more than two chain links, connecting areas having a width smaller than that of the straps and/or the elastically deformable areas of the joint elements, can be provided between the mounting areas of the joint elements by which the joint elements are connected to the two adjacent chain links. As a result, the joint elements extending over several straps can be handled as a single piece. The connecting areas can be arranged in the cross-sectional area of the straps and be flush with the outside of the chain links. In this context, the areas of the straps located above and below the joint elements can be connected by a web, so that the straps are designed as a single piece.

The joint elements are preferably located in recesses in the chain straps. The recesses are preferably open on the end facing the adjacent strap that is connected by the respective joint element. Additionally or alternatively, and regardless of the length of the joint elements, the recesses in the chain straps that accommodate the joint elements can be open on the lateral surfaces facing towards or away from the inside of the energy guiding chain, so that the joint elements can be inserted into the recesses and mounted in the straps in a direction that is transverse, preferably perpendicular, to the primary plane or the lateral surfaces of the straps.

By means of a force, form and/or bonded connection to the straps, the joint element can be prevented from disconnection from the straps perpendicular to the primary plane of the straps and/or from rotating transverse to the straps, particularly if the joint element is arranged in a laterally open recess in the straps.

It is preferable for at least one of two adjacent straps, preferably both, to have recesses on the face end associated with the adjacent strap at the height of the joint element, which are open at the face end and through which the joint element extends. Based at least on the straight position of the energy guiding chain, the recess extends on the side of the joint elements facing the bending direction of the links, preferably on both sides of the joint elements. This play enables the joint element to bend in the manner of a leaf spring, where the central region of the elastically deformable area of the joint element has a slight vertical offset relative to the two adjacent straps during pivoting motion. This results in smoother, less noisy rolling motion of the energy guiding chain.

At the height of the pivoting axis of adjacent straps relative to one another, preferably at the height of the straps and/or in the longitudinal direction of the energy guiding chain, the recess preferably extends from the join element over more than half, or more than twice the thickness of the joint element, e.g. over roughly three to five times the thickness of the joint element or more. The recess formed by the two, facing recesses of adjacent straps can be circular, elliptical or some other shape. The longitudinal extension of the recess can be 20 to 60%, preferably 35 to 45%, e.g. approx. 40% of the length of the joint element or of the distance of the form-fit connecting means securing the joint element to the straps. The recess advantageously extends from the joint element over only part of the strap height and ends at a distance from the top or bottom edge of the strap.

Adjacent straps preferably have interacting means that absorb compression and/or tension forces acting on the energy guiding chain. This relieves the compression and/or tension forces acting on the connecting areas between the joint elements and the straps. The means that absorb the compression and/or tension forces are preferably designed as corresponding projections and undercuts in the form of recesses in the adjacent straps. The projections are preferably arranged on the inner or outer sides of the straps and extend laterally from these towards the inside of the energy guiding chain or in the opposite direction. The recesses for accommodating the projections are limited in the longitudinal direction of the chain by an abutment for the projections that absorbs compression and/or tension forces, so that tension and/or compression forces can be absorbed in the longitudinal direction of the chain. The recess can be closed around part or all of its circumference. The corresponding areas of adjacent straps that absorb tension and/or compression forces can also be designed as corresponding stops that limit the pivoting angle of adjacent chain links relative to one another.

The straps advantageously have overlapping areas that extend in the direction of the adjacent straps and also reach around the sides of the straps. The overlapping areas are preferably provided on each strap, above and below the joint elements. In this context, the overlapping areas can extend from a central region of the straps relative to the longitudinal direction of the chain, whose wall thickness is greater than the wall thickness of the overlapping areas. The overlapping areas considerably increase the lateral stability of the energy guiding chain.

The overlapping areas of a given strap, which are associated with an adjacent strap and located above and below the joint element, are preferably separated from one another by a cut-out opposite the central region of the strap, where the cut-out extends over the entire width of the strap. The cut-out is preferably also at the height of the respective joint element and can have the form of a segment of a circle in reference to a circle that is drawn through the center point of the joint element and lies in the primary plane of the strap. As a result, the length of the strap, and thus also its weight, can be reduced substantially. Preferably, the overlapping areas essentially extend only over the pivoting angle of the straps plus the wall thickness of projections or their corresponding contact areas, which limit the pivoting angle or act as means that absorb tension and/or compression forces. These areas are preferably of web-like design and extend perpendicular to the pivot direction of the straps.

In addition, the overlapping areas, which face an adjacent strap and are located above and below the joint element, are preferably located on different sides of the straps, i.e. on the outside and inside lateral surfaces, or on different sides of the central primary plane of the straps. This also includes arrangements in which the overlapping areas are at a lateral distance from the outermost or innermost areas of the straps, e.g. any thicker areas. The overlapping areas thus display a lateral offset relative to one another. In this context, the corresponding overlapping areas of adjacent straps preferably lie laterally opposite to only one overlapping area of the respectively adjacent strap. This substantially increases the lateral stability of the energy guiding chain. In particular, at least one or both of the overlapping areas defined above can be provided with projections on the side facing the corresponding overlapping area of the adjacent strap, which can be designed as stops or means to relieve or absorb tension or compression forces, for example, without be restricted to this, so that, for assembly purposes, adjacent straps can be tilted or twisted about their longitudinal axes and brought into contact with one another at the face ends, and subsequently rotated about their longitudinal axes, in order to bring the overlapping areas, which are opposite one another in reference to the central primary plane, into lateral contact with one another, whereby the projections engage. This arrangement provides the energy guiding chain with particularly high torsional stability.

The overlapping areas facing an adjacent strap can, however, also be located on the same side of the central strap plane, as in conventional chains with links.

The overlapping areas, which are each arranged on the outside or inside of the strap, can be positioned diametrically opposite each other, so that one of the overlapping areas is located above, and another below the articulated joint.

The arrangement and geometry of the overlapping areas can be varied in many ways. In a particularly advantageous design, the straps are provided with at least two overlapping areas, which have free face ends that face the respectively adjacent strap and are at different angles W1, W2 to a direction R, which is perpendicular to the longitudinal direction of the chain and lies in the primary strap plane. In this context, the face ends are preferably essentially perpendicular to the pivot direction of adjacent chain links. The overlapping areas with face ends at different angles are preferably associated with only one adjacent strap. Each strap can have four overlapping areas, each of which faces an adjacent strap, where the face ends of three or less of the overlapping areas are perpendicular, or essentially perpendicular, to the longitudinal direction of the chain and the face end of at least one or more of the overlapping areas is at an angle to the longitudinal direction of the chain. The angle of the face end to the direction perpendicular to the longitudinal direction of the chain can be approximately 15 to 60°, preferably about 30°. In particular, two different types of overlapping areas can be provided on one strap, each of which is at a different angle from the perpendicular defined above. All overlapping areas can extend over the same pivoting angle, which essentially corresponds to the maximum pivoting angle of adjacent chain links relative to one another.

Adjacent straps are preferably provided with at least one projection, which is covered by an area of the adjacent strap with only little or no play, this preventing the vertical displacement of the straps relative to one another. The degree of play is preferably designed such that the areas are guided on one another during pivot motion of the chain links without making contact, in order to prevent abrasion. When a force is exerted on the straps that causes the vertical displacement of the straps relative to one another, the covered areas of adjacent straps engage, thereby limiting the vertical displacement. The areas of adjacent straps preferably cover one another over the entire pivoting angle, so that the vertical displacement of straps relative to one another is prevented over the entire pivoting angle. The degree of play can be reduced to zero in at least one or both limit positions of the chain links. The projections that prevent vertical displacement can simultaneously function as stops. They can be provided on the overlapping areas or on the central area of the straps and project from the side of the straps towards the inside or outside, or extend in the primary plane of the straps. The projections can be provided in the region of the top edge of the straps, adjacent to the joint elements, or in some other suitable place.

Furthermore, adjacent straps are preferably provided with interacting stops that limit the pivoting angle of the straps in both limit positions. The stops can be designed as projections extending in the primary plane of the straps and projecting in the longitudinal direction of the energy guiding chain from the central strap area, on which overlapping areas can be integrally molded. The stops can also follow on laterally from the overlapping areas. Of course, other suitable stops can also be provided.

The stops are preferably located immediately adjacent to the joint elements, so that the stops come into contact with each other at only a low angular velocity, this enabling the energy guiding chain to travel with low noise generation. The stops are preferably provided directly around the outside of recesses that surround the respective joint element with play, in order to facilitate bending of the joint element. The stops are preferably provided on the side of the central areas of the straps facing the inside of the energy guiding chain and can display a common lateral surface with the adjacent overlapping area. Thus, the wall thickness of the stop roughly corresponds to half the wall thickness of same central area.

The straps of a chain link can be designed in the manner of cranked straps, which can be mirror-symmetrical. The energy guiding chain can also be constructed of opposing strap strands consisting of alternating inside and outside straps, or in some other suitable way, e.g. with forked straps.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 4 is a side elevational view of a joint element according to a further embodiment of the invention;

FIGS. 5a, 5c, 5e, 5g, 5i, 5l, 5n, 5p, 5r, 5t, 5v, and 5x are side views of joint elements in accordance with further embodiments of the invention; and FIGS. 5b, 5d, 5f, 5h, 5k, 5m, 5o, 5q, 5s, 5u, 5w, and 5y are top views of the joint elements of FIGS. 5a, 5c, 5e, 5g, 5i, 5l, 5n, 5p, 5r, 5t, 5v, and 5x, respectively.

DETAILED DESCRIPTION OF THE INVENTION

Figure 1:
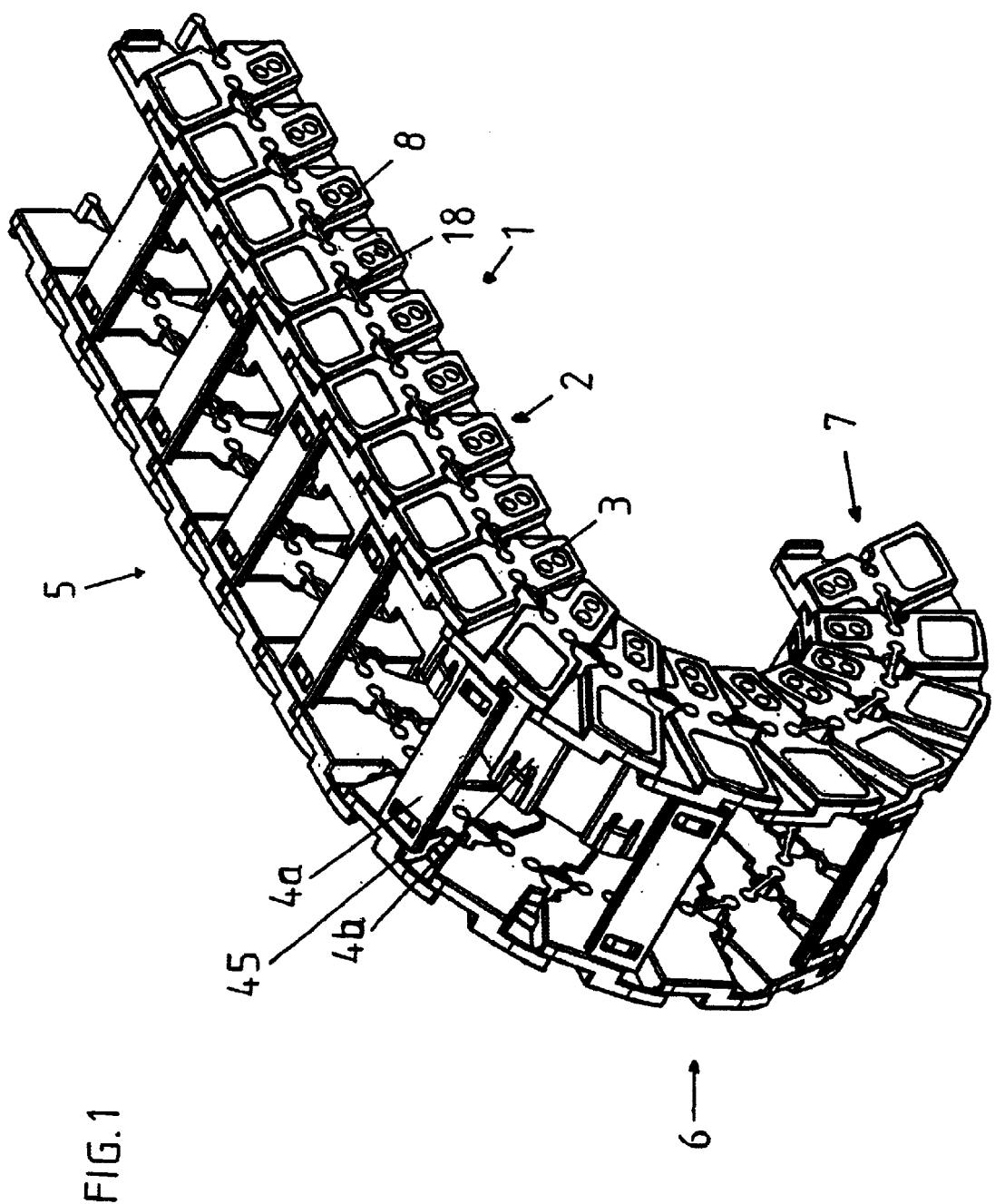
FIG. 1 is a perspective view of an energy guiding chain according to the invention.

The energy guiding chain according to the invention shown in FIG. 1 comprises numerous chain links 2, which are connected to one another in articulated fashion and each of which comprises two straps 3, which are arranged parallel to one another, of mirror-symmetrical design and connected by a top and bottom cross-member 4a, 4b, respectively. Preferably, the cross-members 4a, 4b are mounted on straps 3 in detachable fashion by means of snap elements. The dimensionally stable straps and at least one rigid cross-member, which is mounted stably on the straps, form dimensionally stable torsion-proof chain links. According to the preferred embodiment, at least one of the cross-members can allow at least partial access to the inside of the energy guiding chain, in order to arrange the hoses, cables or the like in the guide channel of the energy guiding chain defined by the straps and cross-members. The energy guiding chain shown can be arranged in curved fashion, forming a lower strand 7, of which only one strap of the first chain link is shown, a deflection zone 6 and an upper strand 5.

Figure 2A:
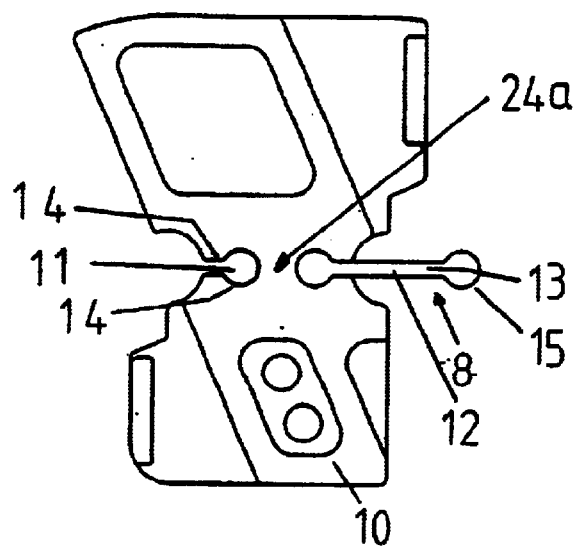
FIG. 2a is an outer side elevational view of a first strap of a chain link assembly that forms part of the energy guiding chain of FIG. 1.
Figure 2B:
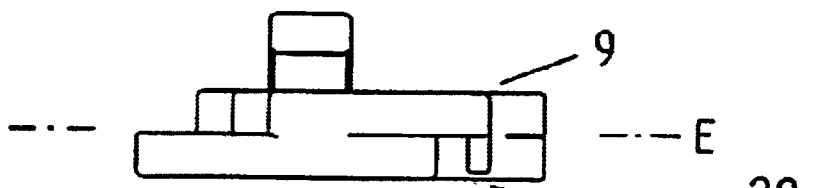
FIG. 2b is a top plan view of the first strap.

Chain links 2 are connected to one another by joint elements 8, each of which, according to the preferred embodiment, connects exactly two adjacent straps 3 in articulated fashion, which alone form the articulated joint. Joint elements 8 are essentially designed as plate-like components, which extend over the entire width of straps 3 and are flush with inside and outside lateral surfaces 9, 10 (FIG. 2b). In this context, the width and length of the elastically deformable areas of joint elements 8 are a multiple of the thickness of the same.

As shown in FIGS. 2a–2e, joint elements 8 are located in laterally open recesses 11 of straps 3, where, according to the preferred embodiment, recesses 11 are designed to be open towards the inside and outside lateral surfaces 9, 10. Consequently, joint elements 8 can be inserted from the sides of straps 3 into recesses 11 and fixed in them. Joint element 8 is elastically deformable in the bending direction of the chain links and designed in the manner of a hinge-like spring element that acts like a leaf spring. Upon being bent out of its straight resting position, joint element 8 exerts elastic restoring forces on the adjacent chain straps, so that the chain straps return completely to their initial position, forming a straight section of the energy guiding chain. However, the joint element can also be designed such that it essentially does not exert any restoring forces, in which case a joint area in the manner of an integral hinge can be provided.

Joint element 8 thus displays a central, elastically deformable area 12, which is located between the face ends of adjacent straps 3 and is bordered by mounting areas 13 on both sides, which fit precisely against surfaces 14 limiting recess 11 in strap 3. Mounting areas 13 have expanded cross-sections 15 on the ends facing away from central area 12, which engage an undercut in the strap, so that the joint elements are secured against longitudinal shifting in recess 11. Independently of this, the joint elements are also prevented from pivoting transverse to the straps by form-fit connectors, which are again provided in this case by expanded cross-section 15, which extends over the entire width of the joint elements. Furthermore, mounting areas 13 of the joint elements (see FIGS. 2a, 2c) display means that prevent joint elements 8 from shifting transverse to straps 3 and are designed here as additional form-fit connectors in the form of a groove 16a in expanded cross-section 15, which extends around part of the circumference (FIGS. 2b, 2d) and in which a corresponding projection of strap 3 engages. The mounting area of the joint element, including the expanded cross-section, is surrounded closely by the strap, i.e. in a press fit.

The joint element is almost entirely relieved from tension and/or compression forces acting in the longitudinal and/or transverse direction of the chain by the strap design described below.

The joint element is arranged half-way up straps 3. The distance between the center points of the two joint elements of a strap is less than the height of the strap, in this case roughly half the height, meaning that the straps are of relatively narrow design and thereby improve the rolling characteristics of the chain. Straps 3 and joint elements 8, which are designed as separate parts, are made of different plastic materials.

Face ends 16, 17 of the straps (FIG. 2c), which face the respectively adjacent strap, have recesses 18 that are open towards the face end, located at the height of joint elements 8 and extend into straps 3. Edge 19 of the strap, which limits recess 18, is at a distance from joint element 8 both above and below it, which is greater than the thickness of joint element 8 in this case, so that it is possible to bend the joint element through a fairly large bending radius. When the energy guiding chain is assembled, recesses 18 of adjacent straps together form a common recess, which extends over the entire length of elastically deformable, central area 12 of the joint element. The length of the central deformable area of the joint element is approximately 40% the total length and four times the wall thickness of the same.

Figure 2C:
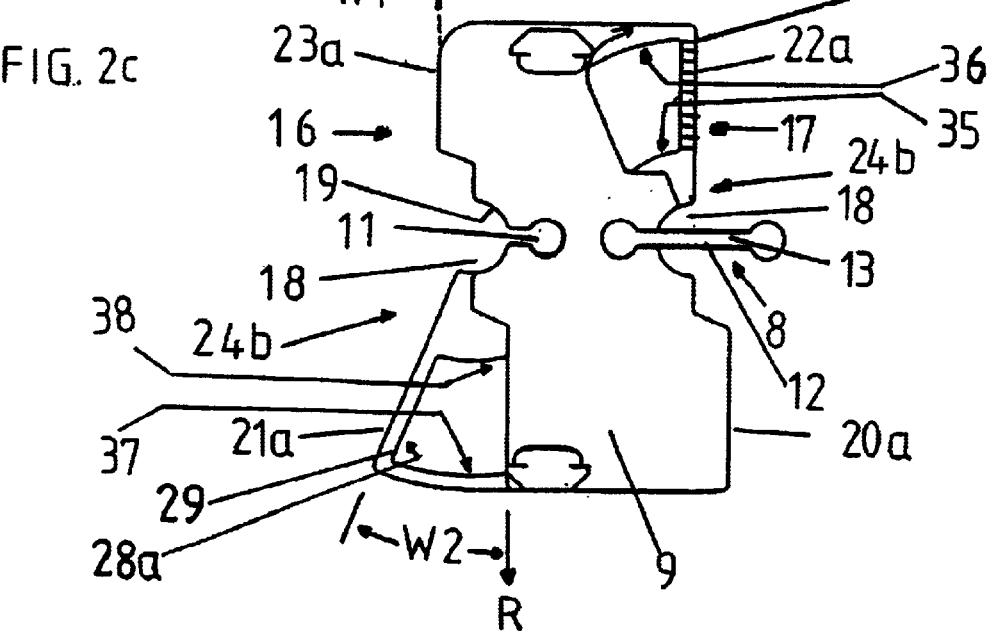
FIG. 2c is an inner side elevational view of the first strap.
Figure 2D:
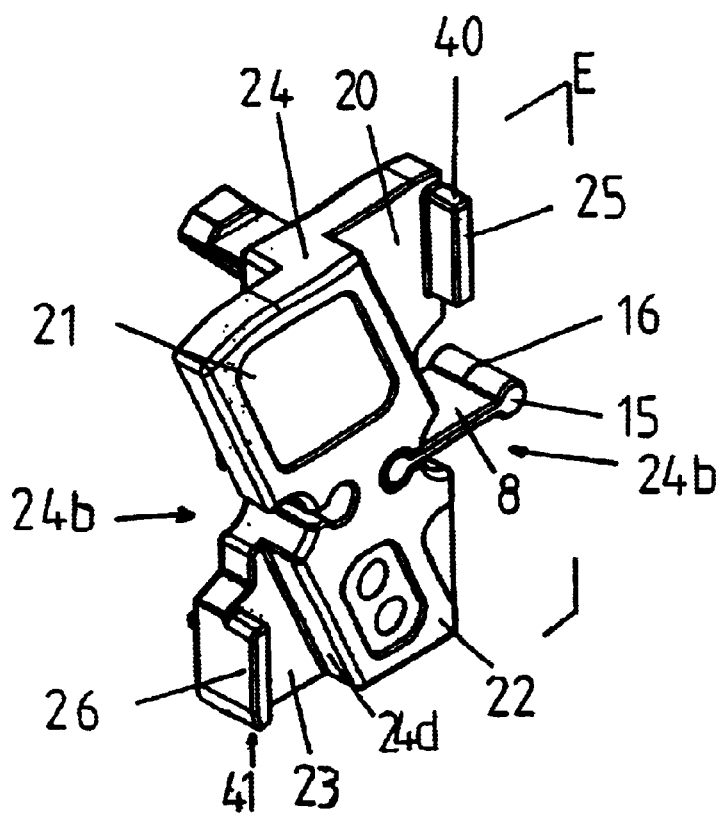
FIG. 2d is an outer side perspective view of the first strap.
Figure 2E:
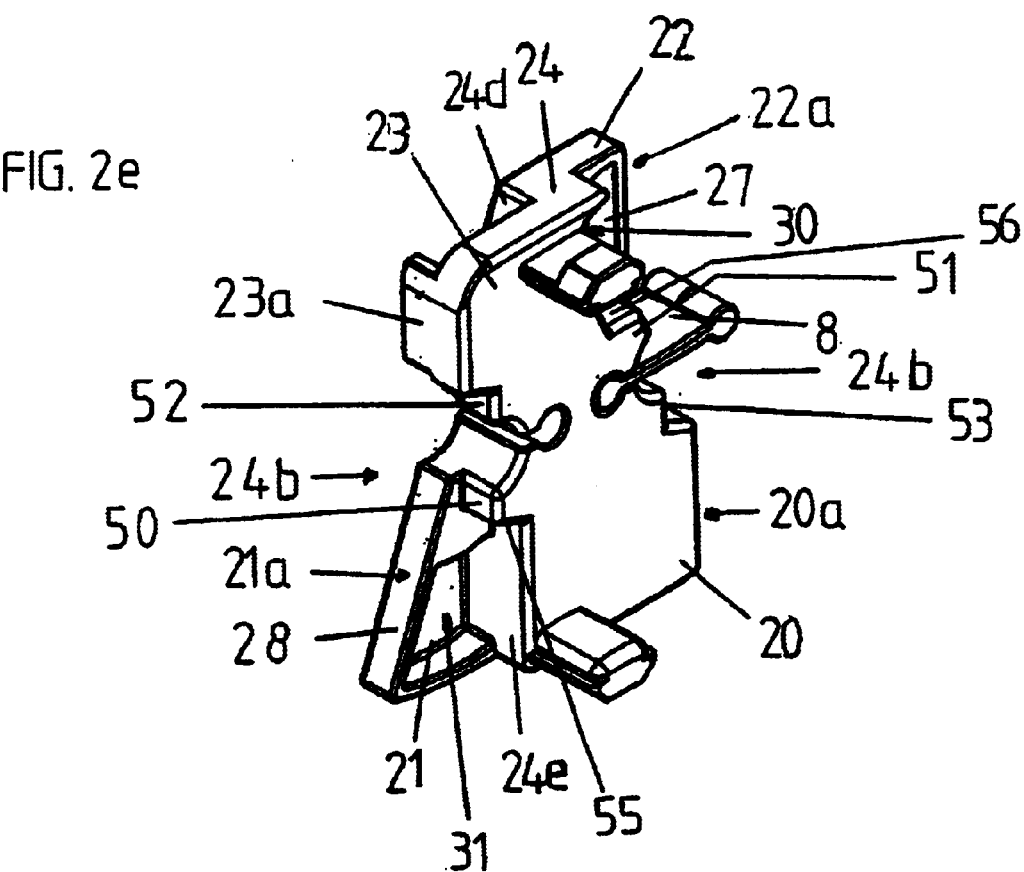
FIG. 2e is an inner side perspective view of the first strap.

According to FIGS. 2c and 2e, straps 3 further display overlapping areas 20 to 23, which overlap corresponding overlapping areas of the two adjacent straps in pairs, thus substantially increasing the lateral stability of the chain links. Overlapping areas 20 to 23 project from the face end of central area 24 of the straps towards the adjacent straps, where central area 24 has a greater wall thickness than the overlapping areas. Each of the adjacent straps thus has two overlapping areas 20, 22 or 21, 23, which are located above (20, 21) and below (22, 23) joint element 8 and separated by a cut-out 24b extending over the width of the straps. In this case, the cut-out is limited by the free, face ends of the overlapping areas, so that the straps can be only short in length. One of the overlapping areas is located on inside lateral surface 9, while the respective other overlapping area associated with the same adjacent strap is located on outside lateral surface 10 of the strap. Overlapping areas 20, 21 and 22, 23 thus lie on opposite sides of primary strap plane E (see FIGS. 2b, 2d).

The extent of overlapping areas 20 to 23 thus essentially corresponds to the angular range of the pivoting angle plus the thickness of projections 25 to 28, which can serve as means to absorb tension and/or compression forces acting in the longitudinal direction of the energy guiding chain and, independently of this, also as stops. Three face ends 20a, 22a, 23a of overlapping areas 20, 22, 23 are perpendicular to the longitudinal direction of the energy guiding chain, while a fourth face end 21a of overlapping area 21 forms an angle W2 with the longitudinal direction of the energy guiding chain, which essentially corresponds to the pivoting angle (FIG. 2c). Overlapping area 21 is thus located on a face end of central strap area 24 that is essentially perpendicular to the longitudinal direction of the chain. Consequently, the straps essentially have the form of two skew parallelograms, which are inclined relative to the longitudinal direction of the chain and the opposite direction. The face ends of an overlapping area and of central area 24, i.e. surfaces 21a and 24d, are aligned relative to one another, while surfaces 20a, 22a and 23a, 24e display a longitudinal offset in the direction of the energy guiding chain (FIG. 2e).

Central area 24a of the straps, from which the overlapping areas extend at the face ends, thus displays face ends that are inclined in the longitudinal direction of the chain, so that the central area tapers at both face ends, both above and below the joint element, in the direction of the upper and lower limiting surface. Therefore, the central area comprises two essentially triangular or trapezoidal areas, whose broad bases meet at the height of the joint elements.

Furthermore, a gap 45 (FIG. 1) is formed between at least one of cross-members 4a, 4b and one overlapping area, in which an overlapping area of the adjacent chain link can engage in a limit position of the chain links. According to the preferred embodiment, this occurs in the straight and fully pivoted limit positions.

Overlapping areas 20 to 23 are provided with projections 25 to 28, which project laterally towards the overlapping area of the adjacent strap and engage the projections of the laterally opposite overlapping area of the adjacent strap (FIGS. 2d, 2e). Projections 26, 28 of strap 3, which are positioned diametrically opposite each other, are part of an edge of a laterally open recess 30, 31. Due to the paired arrangement of overlapping areas 20, 23 and 21, 22 on opposite lateral surfaces of the straps, and to projections 25 to 28 projecting laterally from the overlapping areas, the straps can be pre-assembled by being twisted out of the primary strap plane, after which joint elements 8 can be laterally inserted into recesses 11.

In addition, respectively adjacent straps are provided with projections, which overlap vertically and prevent the vertical displacement of adjacent straps or chain links relative to one another at least or exclusively in the limit position of adjacent links when the energy guiding chain is in the straight position. Vertical displacement is preferably fully prevented exclusively in the limit position when the energy guiding chain is in the straight position, so that rubbing of areas of the chain links against one another is prevented when the chain links pivot relative to one another. For this purpose, arced sections 35 to 38 (see FIG. 2c), which reach over and under projections 25, 27 protruding laterally from the overlapping areas, can be of non-arced design, so that the respective top side 40, 41 (FIG. 2d) of one or both of projections 25, 27 is in contact with the arced sections, thereby preventing vertical displacement, when the chain links are in the limit position and the energy guiding chain in straight and/or fully bent position. Of course, vertical displacement is also prevented when the top and bottom edges 40, 41 of projections 25, 27 are in contact with sections 36, 37, or when the bottom and top edges of a projection are in contact with sections 36 and 38. Additionally or alternatively, other surfaces that interact with one another can also be provided in order to prevent vertical displacement. According to the preferred embodiment, the position and curvature of arced sections 36, 37, as well as those of surfaces 40, 41 of projections 25, 26 facing them, have simultaneously been selected such that, in their limit positions when the energy guiding chain is straight and/or bent, adjacent chain links become wedged together in that the projections are caught on the arced surfaces and can only be separated by applying a small force against the direction of motion into the limit position. In the two limit positions, the vertical play of adjacent straps relative to one another is thus smaller than specified. This results in additional rigidity of the chain in the limit positions.

Side straps 3 are provided with pairs of corresponding stops 50, 51 and 52, 53 (FIG. 2e), which limit the pivoting angle in the linear and pivoted positions of the chain links relative to one another. The stops are designed as cubic projections, which extend from central areas 24 of the straps in primary plane E of the straps towards the opposite strap, where, according to the preferred embodiment, the projecting stops are diametrically opposite each other on the straps and can engage in indentations in the corresponding central areas of adjacent straps. In this context, the stops are directly adjacent to recesses 18, which surround the joint elements. In addition to stops 50 to 53, other surfaces of the straps can also act as stop surfaces to limit pivot motion, such as the front surfaces of projections 25, 27 or the face ends of the overlapping areas or of central area 24. At the same time, surfaces 55, 56 (FIG. 2c), which limit stops 50 to 53 on the side facing away from joint element 8, can also limit the vertical displacement of adjacent straps relative to one another.

In the pocket-like indentations accommodating the projections that act as stops, strips 29, which are made of an elastically deformable material with a higher modulus of elasticity than that of the strap material, are provided on stop surface 28a as a means to dampen the noise generated upon activation of the stops. Alternatively or additionally, as illustrated on the same strap for the sake of simplicity, web 29a, which limits the indentation, can be of elastically deformable design, for which purpose it has a suitable wall thickness or is made of a material with a higher modulus of elasticity than the adjacent strap sections.

Figure 3:
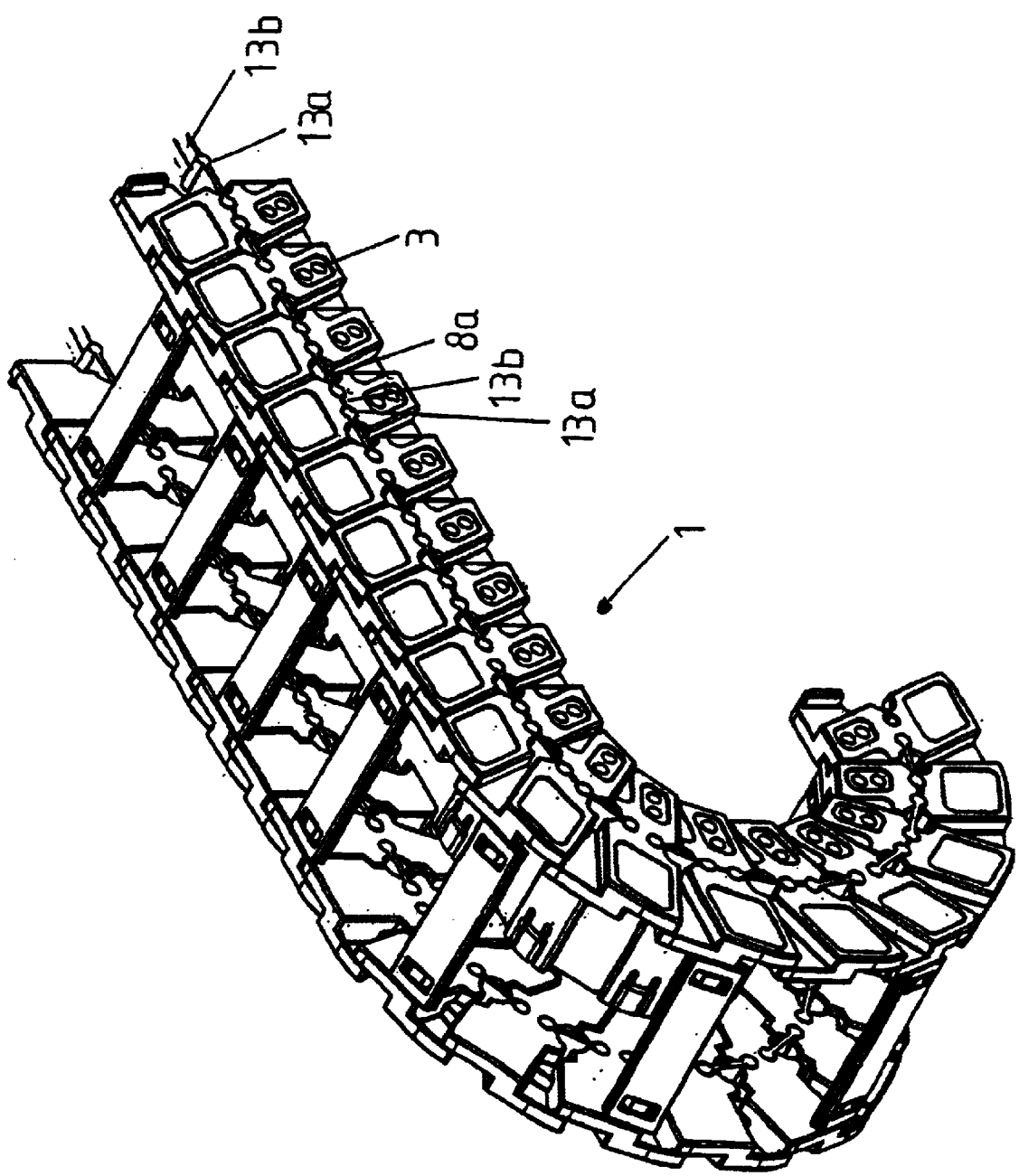
FIG. 3 is perspective view of an energy guiding chain according to a further embodiment of the invention.

FIG. 3 shows an energy guiding chain according to a further embodiment of the invention, the difference between the energy guiding chain of FIG. 1 being that joint element 8a extends over several straps (four) and connects several consecutive straps in the longitudinal direction of the chain in articulated fashion. Located between mounting areas 13a of joint elements 8a are connectors 13b, which have a smaller width than mounting areas 13a and are positioned in grooves in the straps. Numerous joint elements 8a are provided in order to connect the straps of a strand to one another.

FIG. 4 shows a joint element 60 according to a further embodiment of the invention which, unlike the joint element shown in FIGS. 1 and 2, is not straight in the disassembled state. Joint element 60 has an angled central area 62, which is elastically deformable, and mounting areas 61 on its two free ends, to which the same applies as to the joint element according to FIGS. 1 and 2. The joint element can also be arced or of some other curved design. Like joint element 8a in FIG. 3, it can also connect several straps in articulated fashion. In the straight position, joint element 60 can be inserted in recesses in the straps, and thus be under pretension against the straps when the chain is straight. It can also be positioned without pretension in correspondingly designed recesses in the straps.

The joint element can also be adapted to the respective requirements by other modifications, e.g. by constrictions in the elastically deformable area that can be designed in the manner of an integral hinge, for example.

FIGS. 5a to 5y show various joint elements 70 with different cross-sections and/or material thicknesses between opposing mounting areas 71 used for attachment to adjacent straps. The joint elements of FIGS. 5a and 5b, 5e and 5f, 5i and 5k, 5n and 5o, 5r and 5s, and 5v and 5w in the two right-hand columns differ from those of FIGS. 5c and 5d, 5g and 5h, 5l and 5m, 5p and 5q, 5t and 5u, and 5x and 5y, respectively, in the two left-hand columns in that they have connecting areas 72 between mounting areas 71 with different cross-sectional geometries or material thicknesses and central areas with a constant cross-section, while central joint areas 73 to 78 are of the same design. Of course, the design of the connecting areas is also variable.

Joint area 73 according to FIG. 5a becomes thicker from mounting areas 71 towards the center of the joint element in the direction of the primary strap plane when the joint element is mounted. In this case, the thickening is continuous and decreases towards the center.

According to FIGS. 5e and 5f, central joint area 74 is of arced design, where the arc extends in the primary strap plane when the joint element is mounted.

According to FIGS. 5i and 5k, central joint area 75 includes two material strands 75a, which curve outwards in opposite directions and form a cavity 75b open on both sides in between. The material strands in FIG. 5l have the same overall thickness as the connecting area, without being restricted to this.

FIGS. 5n and 5o show a joint element where central joint area 76 includes several, in this case two, material strands of different geometries. In this case, one material strand is straight, and the other curved to the outside.

FIGS. 5r and 5s show a modification of the joint element in FIGS. 5n and 5o, where one of the material strands, the arced one in this case, has an indentation towards the center line (dashed), which facilitates bending in the primary strap plane when the joint element is mounted.

FIGS. 5v and 5w show a joint element in which central joint area 78 has a uniform external cross-section and an area of less material in the form of an internal cavity (dashed), which is closed off from the outside in this case. Alternatively, for example, the central joint area can also be slotted, where the plane of the slot is preferably perpendicular to the primary strap plane or the bending plane.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An energy guiding chain for guiding hoses or cables, the energy guiding chain comprising:
a plurality of interconnected chain links, each chain link have opposing straps with inside and outside lateral surfaces extending substantially parallel to a longitudinal direction of the chain and narrow surfaces perpendicular to the lateral surfaces, at least some of the chain links having at least one cross-member connecting the opposing straps; and
an articulated joint located between adjacent chain links to thereby connect the adjacent chain links together in articulated fashion, the articulated joint including a joint element that extends between the narrow surfaces of adjacent straps and at least partially between the inside and outside lateral surfaces of each adjacent strap, the joint element having an area that is elastically deformable in a bending direction of the chain links such that the energy guiding chain can be bent to form a lower strand, a deflection zone and an upper strand.

2. The energy guiding chain according to claim 1, wherein the joint elements extend entirely between the inside and outside lateral surfaces of the straps.

3. The energy guiding chain according to claim 1, wherein the each strap has mounting elements for receiving an upper cross-member and a lower cross-member, the joint elements being located on the straps at a vertical distance from the mounting elements.

4. The energy guiding chain according to claim 1, wherein the joint elements are spring elements that exert elastic restoring forces on the chain links when adjacent chain links are flexed in the bending direction to thereby trigger at least partial return motion of the chain links against the bending direction.

5. The energy guiding chain according to claim 1, wherein a length of the elastically deformable area of each joint element is a multiple of a thickness of the joint element in the bending direction of the chain links.

6. The energy guiding chain according to claim 1, wherein the joint elements are of substantially plate-like configuration.

7. The energy guiding chain according to claim 1, wherein the joint elements are curved in a plane parallel to the inside and outside lateral surfaces of the straps.

8. The energy guiding chain according to claim 1, wherein the joint elements are secured on the straps against shifting in the longitudinal direction of the energy guiding chain.

9. The energy guiding chain according to claim 1, wherein the joint elements are located in recesses in the straps, the recesses being open to at least one of the lateral surfaces of the straps.

10. The energy guiding chain according to claim 9, wherein the straps have upper and lower areas extending above and below the joint elements, respectively, the upper and lower areas being connected by a web which is located between the elastically deformable areas of two joint elements that connect one of the straps to the respectively adjacent straps.

11. The energy guiding chain according to claim 9, wherein the straps and the joint elements have interacting means that restrain the joint elements against torsional motion transverse to the straps.

12. The energy guiding chain according to claim 1, wherein at least one of the adjacent straps has a recess that opens toward the other of the adjacent straps, with the elastically deformable area of the joint element extending therethrough.

13. The energy guiding chain according to claim 1, wherein the adjacent straps are provided with projections and undercuts, with the projections of one adjacent strap contacting the undercuts of the other adjacent strap to absorb at least one of compression and tension forces, at least when the energy guiding chain is in a straight position.

14. The energy guiding chain according to claim 1, wherein each strap has a first overlapping area that extends towards and overlaps an adjacent strap.

15. The energy guiding chain according to claim 14, wherein each strap has a second overlapping area that extends towards and overlaps an adjacent strap, with the first overlapping area being located above the joint element and the second overlapping area being located below the joint element, the first and second overlapping areas being vertically separated from one another by a cut-out.

16. The energy guiding chain according to claim 15, wherein the first and second overlapping areas are located on the inside and outside lateral surfaces of the strap.

17. The energy guiding chain according to claim 14, wherein the straps have at least two overlapping areas with face ends that face an adjacent strap, the face ends forming different angles with respect to a direction that is perpendicular to a longitudinal direction of the chain.

18. The energy guiding chain according to claim 14, wherein the at least one cross-member has opposite ends that extend past a side of the overlapping area of an adjacent strap, at least in one limit position of the adjacent chain links relative to one another.

19. The energy guiding chain according to claim 1, wherein the straps have interacting, paired stops to limit a pivoting angle between adjacent straps and to provide rigidity in bent and straight positions of adjacent chain links relative to one another.

20. The energy guiding chain according to claim 19, wherein each of the stops is adjacent a recess formed in the strap, with the joint elements extending through the recesses with a degree of play.

21. An energy guiding chain according to claim 19, wherein each strap has a central area with opposing face ends, the stops protruding from the face ends of one strap towards an adjacent strap.

22. The energy guiding chain according to claim 1, wherein the straps are provided with areas which overlap areas of adjacent straps and prevent vertical displacement of adjacent chain links relative to one another, at least when the energy guiding chain is in a straight position.

23. The energy guiding chain according to claim 19, wherein the straps are provided with interacting means for causing adjacent chain links to become wedged together when the chain links are in a limit position corresponding to at least one of a straight and bent condition of the energy guiding chain.

24. The energy guiding chain according to claim 1, wherein the joint element connects a plurality of straps together in articulated fashion, the number of straps being between two and a number that is less than the number of chain links forming the energy guiding chain.

25. The energy guiding chain according to claim 19, wherein the straps comprise stop surfaces for receiving the stops of adjacent straps, and further comprising means for damping an impact velocity of the stops against the corresponding stop surfaces.

26. The energy guiding chain according to claim 1, wherein the joint element comprises two mounting areas that can be connected to adjacent straps, and at least two areas located between the two mounting areas which have at least one different characteristic selected from the group consisting of: cross-section, material thickness, and modulus of elasticity.

27. The energy guiding chain according to claim 1, wherein the joint elements and the straps are made of different materials.

28. An energy guiding chain for guiding hoses or cables, the energy guiding chain comprising:
- a plurality of interconnected chain links, each chain link have opposing straps with inside and outside lateral surfaces extending substantially parallel to a longitudinal direction of the chain and narrow surfaces perpendicular to the lateral surfaces, at least some of the chain links having at least one cross-member connecting the opposing straps; and
- an articulated joint located between adjacent chain links to thereby connect the adjacent chain links together in articulated fashion, the articulated joint including a joint element that extends between the narrow surfaces of adjacent straps and at least partially between the inside and outside lateral surfaces of each adjacent strap, the joint element having an area that is deformable in a bending direction of the chain links such that the energy guiding chain can be bent to form a lower strand, a deflection zone and an upper strand.

* * * * *